April 16, 1957   L. P. FRIEDER ET AL   2,789,076
LAMINATED BALLISTIC FABRIC
Filed Sept. 21, 1953   2 Sheets-Sheet 1
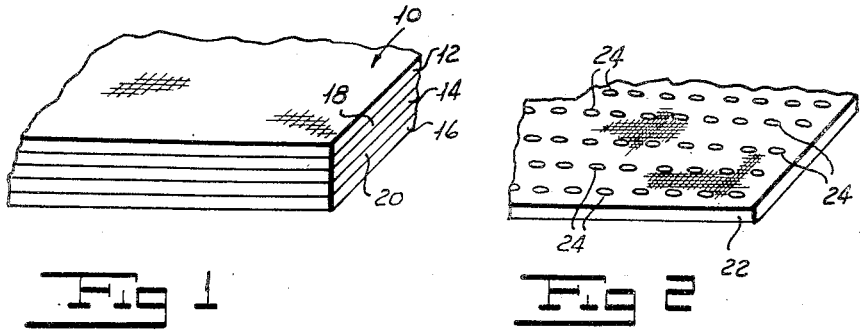
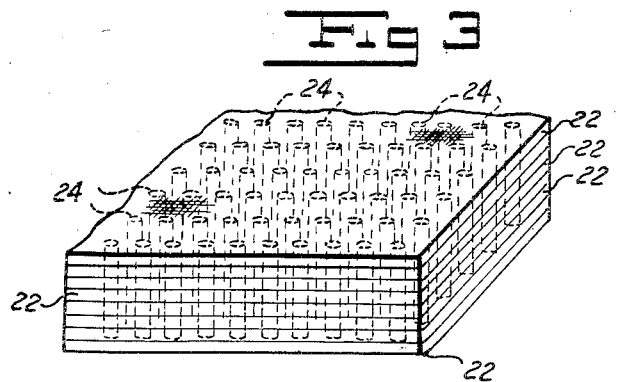
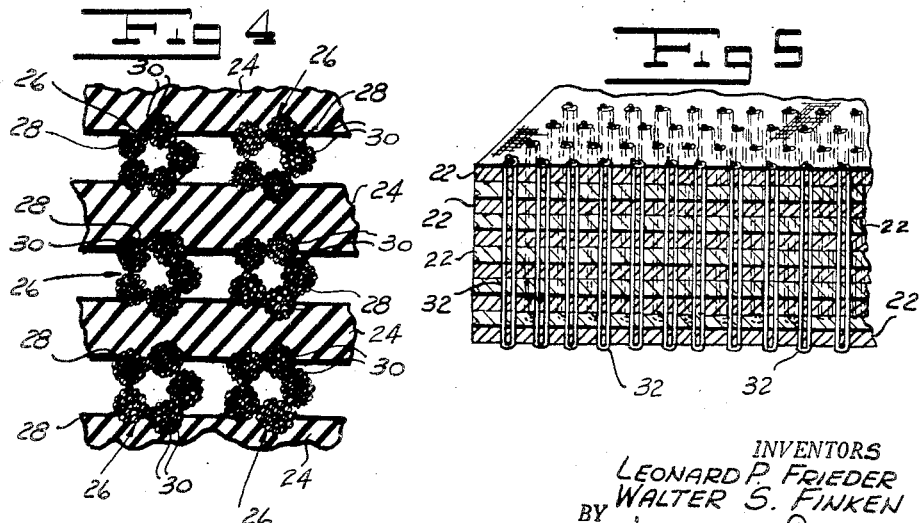
INVENTORS
LEONARD P. FRIEDER
BY WALTER S. FINKEN
ATTORNEY April 16, 1957  L. P. FRIEDER ET AL  2,789,076
LAMINATED BALLISTIC FABRIC
Filed Sept. 21, 1953  2 Sheets-Sheet 2
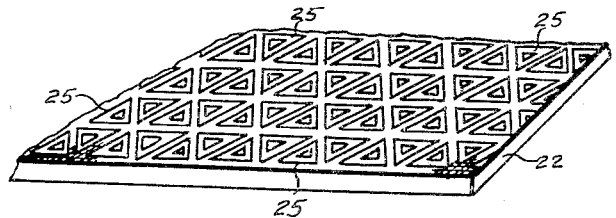
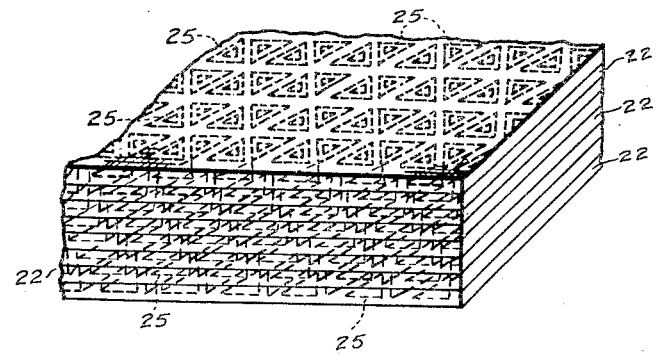
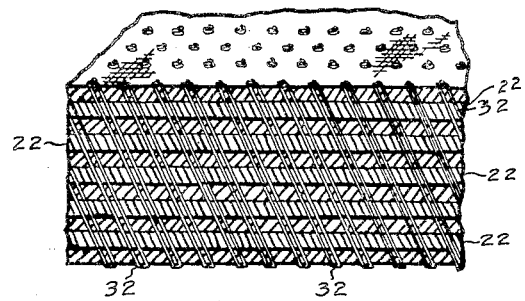
INVENTORS
LEONARD P. FRIEDER
WALTER S. FINKEN
BY
ATTORNEY

United States Patent Office 2,789,076
Patented Apr. 16, 1957

2,789,076

LAMINATED BALLISTIC FABRIC

Leonard P. Frieder, Great Neck, and Walter S. Finken, Brooklyn, N. Y.; said Finken assignor to said Frieder Application September 21, 1953, Serial No. 381,422

8 Claims. (Cl. 154—52.5)

Our invention relates to a laminated ballistic fabric which has a high degree of resistance to penetration by flying fragments, missiles and the like.

The problem of personnel protection has existed as long as wars have been fought by men. Over the centuries many attempts have been made to provide a satisfactory solution to the problem. Body armor, shields, and armor plate have been formed of metal to provide the desired degree of protection. While metal plate, mail and the like have proven satisfactory in some applications, they suffer from a number of disadvantages which render them unsatisfactory for other uses. For example, body armor formed of metal is rigid, bulky, and extremely uncomfortable. Metal is a good conductor of heat and, therefore, affords little comfort to the wearer in extreme weather conditions. It is expensive and not easily formed to shapes where it is suitable for many uses.

It has been suggested that an armor made of plastic laminates be employed to provide protective covering which is lighter, more inexpensive, and which is easily formed to suitable shapes. We have disclosed in our copending application Serial No. 265,598, filed January 9, 1952, that an assembly of plastic laminates which is continuously bonded over the entire surface of the laminates is not substantially more resistant to penetration than is a solid sheet of plastic. To provide a plastic armor which has good penetration-resistant qualities, we disclosed that if a number of plastic laminates are bonded together at discrete points over the surface of the laminates, the ballistic properties of the armor are improved. This can be explained by the fact that when a missile, flying fragment or the like impinges on the surface of such an armor, the bonds provided break and allow the laminates to deflect differentially so that the individual laminates absorb the force of impact of the missile. The bonds provided may be of any suitable material and may be formed in any appropriate manner. The plastic laminates cannot be readily formed into fitted clothing. It has been suggested to use flexible plastic textile material and bond the textile laminates at discrete points. Armor employing such textile laminates bonded at discrete points is disclosed in Patent No. 2,640,987, issued June 9, 1953, to R. W. Ehlers.

We have discovered that the ballistic properties of the armor may be further enhanced by forming each laminate as a fabric made up of yarns formed from highly spun threads. When the yarn making up a laminate is formed of highly spun threads, the residual elongation of the threads is reduced so that the yarns forming the fabric present a hard surface which is highly resistant to penetration by flying fragments, missiles and the like. If desired, the ballistic armor may be formed of a number of layers of laminated fabric between which are disposed layers of a relatively soft material to provide a cushion for the fabric laminates. Our laminated ballistic fabric may be used to form armor to provide protection wherever necessary. For example, it may be employed to form body armor, to provide protection for an aircraft pilot, or it may be used as a mat to shelter any space from flying fragments, missiles and the like. One example of this type of armor is disclosed in our copending application Serial No. 362,338, filed June 17, 1953.

One object of our invention is to provide a laminated ballistic fabric which has a high degree of resistance to penetration by flying fragments, missiles and the like.

Another object of our invention is to provide a laminated ballistic fabric including a number of fabric laminates each of which is made up of yarns formed of highly spun threads having a predetermined number of convolutions per unit length.

A further object of our invention is to provide a laminated ballistic fabric including a number of fabric laminates formed from yarn made up of highly spun threads, the laminates of the fabric being bonded together at discrete intervals over the surface area of each of the laminates.

Still another object of our invention is to provide a laminated ballistic fabric, adjacent laminates of which are bonded together at discrete intervals by plastic bonds in which certain of the yarns of an adjacent pair of laminates are imbedded, the arrangement being such that the bonding material of any bond extends less than half way around the periphery of any yarn.

Other and further objects of our invention will appear from the following description.

For purposes of convenience and to avoid confusion, we have designated each of the major units making up a section of armor as a layer. These layers, or selected ones of the layers, may be made up of a number of superimposed fabrics, each of which fabrics making up a layer we shall designate as a fabric laminate or laminate. These laminates are the basic unit of our invention. A number of the laminates are bonded together at discrete intervals in a manner to be described to make up a layer. A number of layers are superimposed one on top of another and held together by stitching or the like around the outline of the shape of the garment to be formed therefrom to make our ballistic armor.

In general our invention contemplates the provision of a fabric laminate for a ballistic armor including a number of layers of laminated fabric. The laminate is formed from yarn made up of highly spun threads having a predetermined number of convolutions per unit length. This number of convolutions per unit length is critical and is determined from the ultimate elongation of the filaments making up the threads. We spin each of the threads to a number of convolutions per unit length corresponding to a predetermined residual elongation of the filaments making up the thread. That is, we have found that by reducing the residual elongation of the filaments making up the thread of the yarn of the fabric to a predetermined amount, we provide a ballistic fabric which has superior penetration resisting qualities. Adjacent laminates are bonded together by plastic bonds provided at discrete intervals over the surface of the laminates to form a layer of laminated fabric. These bonds may be printed on the laminates by any suitable means such as a silk screen. The viscosity of the bonding material should be such that when the bonds between a pair of adjacent laminates are set, the material making up the bonds therebetween does not engage the material making up the bonds between any other pair of adjacent laminates. That is, plastic areas are printed on the surface of a laminate at discrete intervals and a second laminate is placed thereon so that certain of the yarns of the respective laminates are imbedded in the plastic areas. The arrangement is such that the plastic material of any bond extends around less than 50 percent of the cross-sectional periphery of any yarn thread. This practice is carried out until a layer of laminates of the desired thickness has been formed. Our ballistic armor may include any desired number of layers of laminated fabric, and we may, if desired, interpose layers of soft material between adjacent layers of laminated fabric to provide a seat for the laminated layers. The bonds between the laminates of the laminated layers may be formed by quilting threads passed through the laminated fabric at discrete points if desired. Moreover, selected surfaces of the fabric may be coated with metal to improve the ballistic properties.

In the accompanying drawings which form part of the instant specification and which are to be read in conjunction therewith and in which like reference numerals are used to indicate like parts in the various views:

Figure 1 is a fragmentary perspective view of an assembly of laminated layers making up our ballistic armor.

Figure 2 is a fragmentary perspective view on an enlarge scale of one of the laminates of a laminated fabric layer.

Figure 3 is a fragmentary perspective view on an enlarged scale of a laminated fabric layer.

Figure 4 is a fragmentary sectional view on an enlarged scale of a layer of laminated fabric.

Figure 5 is a fragmentary perspective view on an enlarged scale of a layer of laminated fabric showing a modified form of bond.

Figure 6 is a fragmentary perspective view on an enlarged scale of one of the laminates of a laminated fabric layer showing a further form of bond.

Figure 7 is a fragmentary perspective view on an enlarged scale of a laminated fabric layer in which the form of bond shown in Figure 6 is employed to bond adjacent laminates.

Figure 8 is a fragmentary perspective view on an enlarged scale of a layer of laminated fabric showing yet another form of bond.

More particularly referring now to the drawings, Figure 1 shows a fragment of ballistic armor, indicated generally by the reference character 10, and including a number of layers of laminated fabric 12, 14, and 16 which may be separated, if desired, by layers of relatively soft material 18 and 20. Layers 18 and 20 may, for example, be a relatively soft fabric formed from a large diameter, soft spun yarn or any other appropriate material. While we have shown the armor as including only three layers of laminated fabric separated by a pair of layers of relatively soft material, it is to be understood that in practice we may employ any number of layers of laminated fabric and may or may not separate the layers by layers of soft material. The layers 12 to 20 may be held together by any convenient means such, for example, as stitching around the edge of the shape to which the armor is cut when being formed into body armor or the like. Each of the layers of laminated fabric is formed of a plurality of distinct, integral, fabric laminates 22 which are formed from yarns made up of highly spun threads having a predetermined number of convolutions per unit length, as will be explained in detail hereinafter.

The laminates 22 making up a layer of laminated fabric are bonded together at discrete intervals by bonds 24 between adjacent laminates. These bonds 24 may be made up of any appropriate material, but preferably we employ a mixture of polyester resins and polyvinyl butyral resin. This mixture is applied to a surface of each of the laminates at discrete points by any convenient means. For example, the material may be printed on the surface by means of a silk screen so that deposits of the mixture of appropriate shape and spacing are placed upon a surface of the fabric as shown in Figure 2 or as shown in Figure 6. Preferably we employ bonds 25 of a shape such as is shown in Figure 6 and dispose them relative to one another in the manner shown. As can be seen by reference to Figure 6, these bonds are hollow, equilateral, triangular surfaces. The width of the resinous deposit in a side of the triangle is substantially equal to the length of a perpendicular from the center of the triangle to a side thereof. The spacing between adjacent sides of a pair of triangles is also approximately equal to this distance. It will be appreciated that this bond arrangement provides a bonded area which is approximately equal to or less than the unbonded area over the surface of the laminate. After the spots have been printed on a surface of the respective laminates, a number of laminates may be arranged one on top of another so that the plastic areas 24 on the surface of one laminate register with but do not contact the plastic areas on the surface of the adjacent laminate, as shown in Figure 3. Preferably, however, we employ bonds 25 such as are shown in Figure 6 and arrange the laminates one on top of the other in the manner shown in Figure 7. The arrangement is such that the bonds 25 of pairs of adjacent laminates 22 are staggered with respect to one another from the top to the bottom of the layer. As shown, the bonds of successive laminates may be displaced from left to right from the top laminate down through the bottom laminate so that the apices of corresponding triangular bonds describe an oblique line from top to bottom of the layer. A number of plastic areas are printed on a surface of each of the laminates except one, and the laminates are sandwiched together so that certain of the yarns of the respective laminates are imbedded in the plastic material. The viscosity of the bonding material is such that the material making up any bond, when set, covers less than 50 percent of the cross-sectional periphery of any yarn thread. In practice the plastic bonding material is applied to only one surface of the fabric during the printing operation. If it is printed on the upper surface, there is a bond between this surface and the underside of the laminate superimposed thereon. The bonds 24 may be of any suitable shape such as a small circle, triangle, or other polygon, as desired. Preferably, however, we employ a bond having a hollow polygonal shape such, for example, as the triangular bond 25 shown in Figure 6. When the laminates have been so disposed one on top of the other as shown in Figure 3 or Figure 7, the laminates are cured or polymerized at a suitable temperature, which for the material we employ is approximately 315° F. We provide bonds between adjacent laminates which are flexible in some degree but which break to permit differential deflection of successive laminates when a flying fragment, missile, or the like impinges on the surface of the fabric. That is, the mixture can be controlled to provide a bond of selected strength. Preferably, the strength of the bond is such that it breaks before the fabric yarn breaks.

As can be seen by reference to Figure 4, we have shown, by way of example, fabric laminates formed of a five-ply yarn, indicated generally by the reference character 26, which is formed of a number of threads 28 which threads include a plurality of filaments 30. The viscosity of the mixture of which the bonds 24 are formed is selected so that when the bonds are printed on the surfaces of adjacent laminates, the material will not run together between the yarns 26 or within the interstices of the yarn to form a continuous bond throughout the successive laminates. We form our bonds in this manner to provide only a surface bond between laminates so that when the force of impact of a missile tends to make successive laminates shift with respect to one another, the force will be exerted in part on the yarns making up the laminates rather than being applied to a continuous column of the bonding material. Thereby, the flexibility of the layers of laminated fabric is improved and the laminates of a layer may differentially deflect a small amount before the bonds break.

We may select any number of bonds separated by any appropriate spacing, as desired. We have discovered, however, that to provide the best results, the bonds should be spaced so that approximately 30 percent to 50 percent of the surface area of the fabric is covered by bonds. It will be appreciated that the preferred form of bond 25 illustrated in Figure 6 provides bonded areas which are approximately equal to the unbonded areas on the surface of the laminates. If a less area than 30 percent is covered by the bonding medium, the function of the bonds in helping to absorb the force of impact is reduced, since the resistance provided is too small. On the other hand, if substantially more than 50 percent of the surface area of the fabric is occupied by bonds, we approach the condition of a continuous bond where there is insufficient flexiblity. Furthermore, there will be insufficient differential deflection of laminates.

Figures 5 and 8 show another form of bond which may be employed to join the laminates of a layer of laminated fabric. A number of bonding threads 32 are passed through the successive laminates from top to bottom and back again and the ends secured in any suitable manner such as tying. These quilting threads 32 are spaced in the same manner as the bonds 24 and draw the laminates together to a degree which will provide sufficient resistance to shifting of the laminates with respect to each other so that the layer has good ballistic properties and yet which is not such that the quilting threads are so tightly drawn that the layer of laminates is not flexible. While in Figure 5 we have shown the threads 32 as passing perpendicularly through the fabric layer, advantageously we pass the threads diagonally through the layer as shown in Figure 8, thus staggering the bonding points on the surfaces of successive laminated layers. This latter arrangement better enables our ballistic fabric to resist the force of impact of a projectile or flying fragment, since threads are subjected to radial motion before being stressed to rupture. The threads 32 may be formed of any suitable material but preferably we employ a thread formed of continuous synthetic filaments which are of the desired tensile strength.

As was explained hereinbefore, each of the yarns 26 from which a fabric laminate 22 is formed is made up of a number of threads 28. Each of the threads 28 in turn includes a plurality of filaments 30. These filaments 30 may be formed of any appropriate material, but preferably we employ synthetic, continuous filaments such as nylon or the like. If desired, we can substitute other materials such as metal filaments or glass filaments. The filaments 30 could also be formed from stable fiber material.

The ballistic properties of our laminated ballistic fabric depend to a large extent on the degree of spinning of the threads 28 making up a yarn 26. We employ highly spun threads having a predetermined number of convolutions per unit length. Since the number of convolutions per unit length of the thread is critical, some method must be provided for determining the proper number. To accomplish this we first select a sample length of the filamentary material from which the threads are to be formed and determine its ultimate elongation. This may conveniently be accomplished by placing the filament under controlled tension and measuring its elongation up to the point at which the filament parts. This is the ultimate elongation. It is to be understood that the ultimate elongation of filamentary material ordered to particular specifications will vary from bobbin to bobbin so that the ultimate elongation must be determined for each bobbin. It will be obvious that this ultimate elongation determines the residual elongation of the filaments making up the threads and so must be determined also for each type material.

Next, a filament of the type material to be employed is placed under a controlled tension and the amount of tension per unit of cross-sectional area required to produce an elongation which is 50 percent of the ultimate elongation of the material is measured. The tension per unit of cross-sectional area required to produce an elongation which is 90 percent of the ultimate elongation of the material is then determined.

Each of the threads making up a yarn is formed of a selected number of filaments. The number of filaments may be any convenient number such, for example, as thirty-four. This bundle of filaments making up a thread is spun on a suitable torsional apparatus provided with means for measuring the amount of tension applied to the bundle of filaments and the number of turns applied to the bundle. For example, it may be arranged between a pair of anchor posts and torsion applied through a motor-driven spindle equipped with a reducing gear train and a revolution counter. The filaments of the bundle are first spun together until the tension per unit area theretofore determined to produce an elongation which is 50 percent of the ultimate elongation of a filament is reached. Assuming that the filaments of the bundle are of the same cross-sectional area as the individual filament tested, this tension will be thirty-four times the tension theretofore determined for a single filament. When this tension has been reached, we count the number of turns or convolutions per unit length in the yarn. If the anchor posts are spaced a predetermined number of units of length apart, the number of turns or convolutions can be determined by dividing the reading of the revolution counter by the distance separating the anchor posts. Next, the same procedure is carried out to determine the number of turns or convolutions per unit length required to produce a tension per unit of cross-sectional area which is equal to the tension per unit of cross-sectional area required to produce an elongation of a single filament which is 90 percent of its ultimate elongation.

To form a fabric having superior ballistic properties, we spin the threads making up the yarn forming the fabric to a number of convolutions per unit length which is between the two limits outlined above. These limits of 50 percent and 90 percent of the ultimate elongation of the filaments of the yarn are critical. If the filaments are not spun to a number of convolutions per unit length corresponding to at least 50 percent of the ultimate elongation, the ballistic properties of the fabric are substantially reduced. If, on the other hand, the filaments are spun to a number of convolutions corresponding to more than 90 percent of their ultimate elongation, the residual elasticity will be reduced to such an extent that the threads will shear too easily and the ballistic properties of the cloth, consequently, will diminish.

It will be appreciated that the procedure outlined above reduces the residual elongation of the threads making up a yarn to within predetermined limits. We have found that in so stretching the filaments a partial set is imparted to them and the return of a stretched filament is less when the filament is stretched to between 50 percent and 90 percent of its ultimate elongation than it is when the filament is stretched below this range of its ultimate elongation. A degree of permanent set increases resistance to penetration. We have, therefore, selected our limits so that we are within the 50 percent to 90 percent range where the return is relatively small. If the filaments are spun to a degree corresponding to an elongation which is 90 percent of the ultimate elongation, the filaments receive a greater degree of permanent set. When the threads are so spun, the ballistic properties of the fabric are further enhanced. It is to be understood that while we preferably employ a continuous synthetic filament, other materials may likewise be used. The number of convolutions per unit length to produce a high degree of resistance to penetration in the fabric will, of course, vary depending upon the type material to be used. Consequently, the number of turns or convolutions per unit length corresponding to, respectively, 50 percent and 90 percent of the ultimate elongation of a filament must be determined for each type material.

As will be apparent from an examination of Figure 4, each of the highly spun threads 28 is made up of a number of filaments 30. After the threads have been spun, a number of threads, five as shown, are cabled together to form a yarn 26. This cabling is generally accomplished in a direction opposite to the direction in which the threads are spun. Only a small number of cable turns per unit length are employed, but this number of turns must be added to the number of convolutions for the threads in considering these, since the cabling is in a direction to unwind the threads.

The ballistic properties of fabric may be augmented further by metallizing selected surfaces of the fabric, as by depositing a coating of metal thereon.

As explained hereinbefore, the ballistic properties of our fabric are determined by the number of convolutions per unit length applied to the threads making up the fabric yarn. In use, our armor may encounter two general classes of missile. First, there is a spinning projectile of a type fired from a rifle and having a sharp nose. This type of missile depends for its penetrating action on a very highly localized force of impact applied in a restricted area. We have found that our ballistic fabric best resists penetration by such a missile when formed from yarns made up of highly spun threads having a number of convolutions per unit length corresponding to the number of convolutions required to produce an elongation which is near 90 percent of the ultimate elongation. When the threads are so spun, a fabric results which is extremely dense and which presents a hard surface to a missile impinging thereon. This density and hard surface enables the fabric to resist penetration by a projectile exerting an extremely localized force of impact in a restricted area.

The other type of missile to which our armor is to be resistant is a flying fragment of the shrapnel type. This type missile exerts its force of impact over a larger area on the surface of the fabric and creates tensile stresses in the yarns which tend to break them. Fabric formed of yarns made up of threads spun to a number of convolutions corresponding to an elongation which is 90 percent of the ultimate elongation has not proved to be the most efficient fabric for resisting penetration by missiles of the shrapnel type. This may be explained by the fact that the residual elongation is reduced to a point where the yarns may be relatively easily broken under stress. We have discovered, however, that if we form our laminated ballistic fabric from yarns made up of threads having a number of convolutions per unit length corresponding to an elongation which is in the vicinity of 50 percent of the ultimate elongation, a fabric results which is highly resistant to missiles of the shrapnel type. This fabric, however, is not as efficient for resisting penetration by missiles having sharp noses as fabric formed from more highly spun threads, since it does not present as hard or compact a structure as yarns formed of threads spun to a degree corresponding to approximately 90 percent of the ultimate elongation.

While our laminated ballistic fabric has superior penetration-resisting qualities to either type missile when formed of yarns made up of threads spun to within the critical limits, to provide the optimum design for armor it is preferable to employ layers of laminated fabric, some of which are made up of yarns formed of threads spun to a degree corresponding approximately to 50 percent of the ultimate elongation and others of which are formed of yarns made up of threads spun to a degree corresponding approximately to 90 percent of the ultimate elongation. That is, for example, if the layer 12 is formed of yarns made up of threads spun to a degree corresponding to an elongation in the neighborhood of 50 percent of the ultimate elongation, it will sufficiently resist penetration by shrapnel and the like but may not efficiently resist a sharp-nosed projectile. To resist penetration by the sharp-nosed projectile, the layer of laminated ballistic fabric 14 may be formed from yarns made up of threads spun to a degree corresponding to an elongation which is in the vicinity of 90 percent of the ultimate elongation. This latter layer may not efficiently resist shrapnel, but will resist sharp-nosed projectiles. Thereby we may provide an armor which is highly resistant to penetration by both missiles of the shrapnel type and missiles having sharp noses.

In use, when a flying fragment, missile, or the like strikes the surface of our laminated ballistic fabric, it exerts a localized penetrating force thereon. This force tends to flex the laminates 22 of a fabric relative to one another. It will be appreciated that this deflection will be a differential deflection; that is, the surface laminate will be more acutely deflected than will the succeeding laminates. Each laminate 22 from the surface of the fabric inward will be deflected to a lesser degree.

In order that differential deflection of the laminates 22 take place, it is necessary that the bonds 24, 25, or 32 between adjacent laminates be broken. The mixture of polyester resin and polyvinyl butyral making up the bonds 24 or 25 is selected so that the bonds 24 or 25 have a predetermined strength. It is to be noted also, as pointed out hereinbefore, that the bond between one pair of laminates and the bond between an adjacent pair of laminates are spaced from one another. As a result, some of the force tending to deflect the laminates is absorbed by the fabric yarns contacted by the bonds. The strength of the bonds is such, however, that they shear before the yarns. As a result, differential deflection between successive laminates is made possible. Similarly, the quilt threads are of the proper tensile strength to rupture before the yarns of any of the laminates are broken.

As pointed out hereinbefore, our improved fabric depends largely for its penetration-resistant power on the degree of spinning of the threads making up the yarn. If the fabric is intended primarily for use to resist sharp-nosed projectiles, the threads 28 are spun so that they have a number of convolutions per unit length which corresponds to the number of convolutions per unit length required to produce an elongation of the filaments 30 making up the threads which is approximately 90 percent of the ultimate elongation of the filaments. If, on the other hand, the fabric is one which is to be resistant to shrapnel, the threads 28 are spun to a number of convolutions per unit length which is in the neighborhood of the number of convolutions per unit length required to produce an elongation of the filaments 30 which is approximately 50 percent of their ultimate elongation. A ballistic cloth can be made up from our ballistic fabric which includes layers of laminated ballistic fabric, some of which are resistant to penetration by sharp-nosed projectiles and others of which are resistant to shrapnel. While we have pointed out the fact that a greater number of convolutions per unit length provides better resistance to sharp-nosed projectiles than does a lesser number of convolutions and that threads spun to a lesser number of convolutions per unit length are more resistant to penetration by shrapnel, it is to be understood that a fabric formed from yarns made up of threads spun to a number of convolutions per unit length within the specified range has superior ballistic properties for either type missile.

Thus it will be seen that we have accomplished the objects of our invention. We have provided a laminated ballistic fabric having superior penetration-resisting qualities and which is inexpensive to manufacture. Our laminated ballistic fabric is, moreover, extremely light, flexible, and provides good insulation to ensure comfort to the wearer. We have provided a laminated fabric including a plurality of laminates formed of yarn made up of highly spun threads having a predetermined number of convolutions per unit length whereby the ballistic properties of the fabric are substantially improved. The laminates of the fabric are bonded to one another at spaced intervals to permit differential deflection under the force of impact of a missile. We have provided plastic support bonds which permit the yarns making up the fabric to absorb the force of impact, and we have disclosed quilting threads as an alternate means of bonding. Armor may be formed from our laminated fabric by including layers of laminated fabric, each having a yarn formed of highly spun threads with respective numbers of convolutions per unit length to resist penetration either by missiles having sharp noses or by shrapnel. Layers of relatively soft material may be interposed between the layers of laminated fabric to provide a cushion therefor to absorb the force of impact.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A ballistic fabric including in combination a plurality of distinct integral woven fabric laminates and a plurality of bonds between adjacent pairs of laminates, said bonds being disposed at spaced intervals over the surfaces of said pairs of laminates, said laminates being formed from yarns made up of highly spun threads each including a plurality of filaments, said threads having a predetermined number of convolutions per unit length required to produce an elongation of said filaments which is between 50 percent and 90 percent of the ultimate elongation of said filaments.

2. A ballistic fabric including in combination a plurality of distinct integral woven fabric laminates and a plurality of bonds between adjacent pairs of laminates, said bonds being disposed at spaced intervals over the surfaces of said pairs of laminates, said laminates being formed from yarns made up of highly spun threads having a predetermined number of convolutions per unit length required to produce an elongation of said filaments which is between 50 percent and 90 percent of the ultimate elongation of said filaments, said bonds being formed by deposits of plastic between adjacent laminates, the arrangement being such that the bonds between one pair of laminates register with and are spaced from the bonds between adjacent pairs of laminates whereby a surface bond between adjacent laminates is provided.

3. A ballistic fabric including in combination a plurality of distinct integral woven fabric laminates and a plurality of bonds between adjacent pairs of laminates, said bonds being disposed at spaced intervals over the surfaces of said pairs of laminates, said laminates being formed from yarns made up of highly spun threads having a predetermined number of convolutions per unit length required to produce an elongation of said filaments which is between 50 percent and 90 percent of the ultimate elongation of said filaments, said bonds being formed by plastic areas deposited at discrete intervals between adjacent laminates so that certain yarns of the respective laminates are imbedded in said plastic areas, the arrangement being such that the material making up any bond contacts less than 50 percent of the cross-sectional periphery of any yarn thread.

4. A ballistic fabric including a plurality of distinct integral woven fabric laminates, said laminates being formed from yarns made up of highly spun threads having a predetermined number of convolutions per unit length required to produce an elongation of said filaments which is between 50 percent and 90 percent of the ultimate elongation of said filaments and a plurality of separate quilting threads bonding said laminates together, said quilting threads being disposed at spaced intervals over the surfaces of the laminates.

5. A ballistic fabric including in combination a plurality of distinct integral woven fabric laminates and a plurality of bonds between adjacent pairs of laminates, said bonds being disposed at spaced intervals over the surfaces of said pairs of laminates, said laminates being formed from yarns made up of highly spun threads having a predetermined number of convolutions per unit length required to produce an elongation of said filaments which is between 50 percent and 90 percent of the ultimate elongation of said filaments, said bonds being formed from a mixture of a polyester resin and polyvinyl butyral resin disposed between adjacent laminates.

6. In a ballistic fabric a plurality of distinct integral woven laminates, each of said laminates being formed from yarn made up of highly spun threads, each of said threads including a plurality of filaments and having a number of convolutions per unit length required to produce an elongation of said filaments which is between 50 percent and 90 percent of the ultimate elongation of all filaments.

7. In a ballistic fabric a plurality of distinct integral woven fabric laminates, each of said laminates being formed from yarn made up of highly spun threads, each of said threads including a plurality of filaments and having a number of convolutions per unit length required to produce an elongation of said filaments which is approximately 50 percent of the ultimate elongation of the filaments.

8. In a ballistic fabric a plurality of distinct integral woven fabric laminates, each of said laminates being formed from yarn made up of highly spun threads, each of said threads including a plurality of filaments and having a number of convolutions per unit length required to produce an elongation of said filaments which is approximately 90 percent of the ultimate elongation of the filaments.

References Cited in the file of this patent

UNITED STATES PATENTS

| 1,465,767 | Krause | Aug. 21, 1923 |
| 2,075,777 | Brownell | Mar. 30, 1937 |
| 2,399,184 | Heckert | Apr. 30, 1946 |
| 2,466,597 | Kropscott et al. | Apr. 5, 1949 |
| 2,495,808 | Colmant | Jan. 31, 1950 |
| 2,562,951 | Rose et al. | Aug. 7, 1951 |
| 2,640,987 | Ehlers | June 9, 1953 |